United States Patent

Cheong et al.

[11] Patent Number: 5,843,594
[45] Date of Patent: Dec. 1, 1998

[54] GROUP OF WINDING ELECTRODES

[75] Inventors: Jin Dong Cheong, Kyungki-do; Jong Wook Lee; Byoung Hyun Kang, both of Suwon, all of Rep. of Korea

[73] Assignee: Samsung Display Devices Co., Ltd., Suwon, Rep. of Korea

[21] Appl. No.: 871,249

[22] Filed: Jun. 9, 1997

[30] Foreign Application Priority Data

Oct. 6, 1996 [KR] Rep. of Korea ................... 1996-20552

[51] Int. Cl.$^6$ ...................................................... H01M 4/00
[52] U.S. Cl. ........................... 429/94; 427/223; 29/623.1; 29/623.3; 29/623.5; 361/313; 361/512; 361/530
[58] Field of Search .................... 429/94, 223; 29/623.1, 29/623.3, 623.5; 361/313, 512, 530

[56] References Cited

U.S. PATENT DOCUMENTS

| | | | |
|---|---|---|---|
| 4,802,275 | 2/1989 | Freluche | 29/623.4 |
| 5,508,122 | 4/1996 | Narukawa et al. | 429/94 |
| 5,532,074 | 7/1996 | Golben | 429/94 |
| 5,631,102 | 5/1997 | Spillman et al. | 429/94 |
| 5,637,416 | 6/1997 | Yoshii et al. | 429/94 |

FOREIGN PATENT DOCUMENTS 2184594  6/1987  United Kingdom.

*Primary Examiner*—Bruce F. Bell
*Attorney, Agent, or Firm*—Christie, Parker & Hale, LLP

[57] ABSTRACT

A cylindrical cell is fabricated with a cathode, an anode, a separated placed between the cathode and anode, and a separator fragment extending from a winding axis to the initial part of a cathode.

10 Claims, 2 Drawing Sheets

GROUP OF WINDING ELECTRODES

BACKGROUND OF THE INVENTION

1. Field of the Invention

The present invention relates to a group of winding electrodes, and more particularly, to a group of winding electrodes that prevents short-circuiting, decreases packing rate, improves assembly, and increases durability, capacity, and yield for a cylindrical cell or a condenser.

2. Description of the Related Art

A group of winding electrodes, such as a cylindrical cell or a condenser, has a separator to prevent short-circuiting of the cathode and anode. The present invention relates to cell technology having a cathode, an anode and a separator. A cylindrical cell, especially a cylindrical nickel-hydrogen cell, is described as an example.

More and more portable electronic devices, such as a camera, a camcorder, a portable CDP, a radio, a cassette, a notebook computer, a pager and a cellular phone, etc., require a cell having higher capacity and longer durability.

In general, a cell is a device that converts chemical energy into electric energy by means of contact potential difference and many kinds of such cells are conventionally known to those skilled in the art. Electrochemical cells and batteries are technologically identified as nonchargeable primary cells, rechargeable secondary cells, fuel cells that convert combustion heat into electric energy or solar cells that convert light energy into electric energy. Electrochemical cells and batteries are classified by the composition of electrolyte and the shape of the cells and batteries. The composition of electrolyte is either an alkaline, a solid or nonaqueous. The shape of a cell or battery can either be cylindrical, button or coin type.

In these kinds of cells, a cylindrical cell (jelly-roll type) discharges current and is composed of a cathode, an anode, a separator, electrolyte, a positive terminal, and a negative terminal. The specific structure of a nickel-hydrogen cell is illustrated in FIG. 4. The cylindrical nickel-hydrogen cell is composed of a cathode (13) coated with $Ni(OH)_2$ as a positive active material, an anode (15) of a hydrogenated alloy coated with a negative active material which is mainly composed of $LaNi_5$, $MmNi_5$, Ti—Fe or Ti—Ni alloy, a separator (17) which is made of a nonwoven fabric to prevent the cathode (13) and the anode (15) from short-circuiting, a can (12) consisting of an insulating ring (27) and an insulating plate (29), and a cover plate (25) consisting of a cap (19), gasket (21), and a safety vent (23). The can (12) serves as a negative terminal and the cover plate (25) serves as a positive terminal.

The process for fabricating a cylindrical nickel-hydrogen cell is as follows. Before assembly, the cathode is manufactured by coating a slurry of a positive active material on a metallic support and then drying and rolling the coated metallic support. The anode is manufactured by coating a slurry of a negative active material on a metallic support and then drying and rolling the coated metallic support. A separator (17) is laid between the cathode (13) and anode (15) and spirally wound. The wound assembly is inserted into a can (12). The electrolyte is poured into the can (12). The cell is sealed by crimping the cover plate (25) to the top assembly of the can (12).

A detailed description of the charge and the discharge reaction of the cylindrical nickel-hydrogen cell manufactured according to the above method is as follows.

A hydrogenated alloy is used as a negative active material, nickel hydroxide is used as a positive active material and potassium hydroxide (KOH) aqueous solution is used as an electrolyte. The hydrogenated alloy stores hydrogen ions produced by cleavage of water in the electrolyte during the charging process, and releases hydrogen ions into the electrolyte during the discharging process. The charge and discharge reactions are as follows.

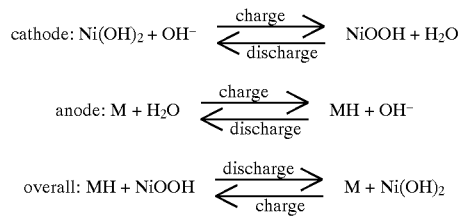

In the above reactions, M is a hydrogenated alloy that can absorb and emit hydrogen ions, identified as an $AB_5$ group that is made of rare earth elements or an $AB_2$ group that is made of Ti, Zr, V, etc. According to the above reaction, a cell performs a charge and discharge more than hundreds of times.

The process for fabricating a cylindrical nickel-hydrogen cell which has the above function and structure is as follows.

FIG. 1A shows the assembly of electrodes where a cathode (13) and an anode (15) are spirally wound with a separator (17) interspaced between the two electrodes by using a mandrel (11).

The above-mentioned assembly is then inserted into a can and electrolyte is poured into the can. However, the separator (17) occupies a lot of space and only a limited amount of electrolyte can be poured into the can thereby decreasing the capacity of a cell using such an assembly.

Another problem with the above-identified cell is that the separator (17) can rip during the winding process thereby short-circuiting the cathode (13) and the anode (15).

To solve the above-mentioned short-circuit problem, a technique of placing an additional separator (31) in the initiating site of both electrodes is shown in FIG. 2. Although the additional separator (31) reduces the probability of the separator (17) ripping and the cathode (13) and anode (15) short-circuiting, the capacity of the cell is decreased more because of the additional space occupied by the additional separator (31).

The foregoing defect occurs in all kinds of groups of winding electrodes including a cylindrical cell and a cylindrical condenser as well as the foregoing cylindrical nickel-hydrogen cell.

SUMMARY OF THE INVENTION

In order to solve problems of the conventional art described above, an object of the present invention is to provide a cell comprising a cathode, a positive terminal linked to said cathode, an anode, a negative terminal linked to said anode, a separator placed between said cathode and said anode, an electrolyte, and a separator fragment starting from substantially at a winding axis and extending to the initial part of the cathode. Preferably, the group of winding electrodes is a cylindrical cell or a cylindrical condenser. Alternatively, the group of winding electrodes is preferably a cylindrical nickel-hydrogen cell.

In order to solve problems of the conventional art described above, an object of the present invention is to provide a method of fabricating a group of winding electrodes comprising the steps of manufacturing a cathode by coating a slurry of positive active material on a metallic support and then drying and rolling the coated metallic support; manufacturing an anode by coating a slurry of negative active material on a metallic support and then drying and rolling the coated metallic support; laying a separator between said cathode and said anode; laying a separator fragment starting at substantially a winding axis and extending to the initial part of said cathode; winding the cathode, anode, separator and separator fragment; inserting the wound cathode, anode, separator and separator fragment into a can; injecting a electrolyte into the can; and mounting a cap assembly in the mouth of the can.

Additional objects, advantages and novel features of the invention will be set forth in part in the description which follows, and in part will become apparent to those skilled in the art upon examination of the following and may be learned by practice of the invention. The object and advantages of the invention may be realized and attained by means of the instrumentalities and combinations particularly pointed out in the appended claims.

Figure 1A:
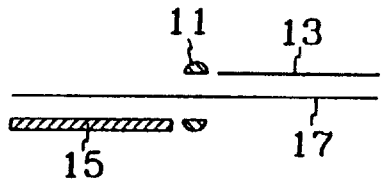
FIG. 1A is a schematic diagram showing a conventional cylindrical nickel-hydrogen cell before the winding process.

In the following detailed description, only the preferred embodiment of the invention has been shown and described, simply by way of illustration of the best mode contemplated by the inventor(s) of carrying out the invention. As will be realized, the invention is capable of modification in various alternative respects, all without departing from the invention. Accordingly, the drawing and description are to be regarded as illustrative in nature, and not as restrictive.

DETAILED DESCRIPTION OF THE INVENTION

EXAMPLE 1

Figure 3A:
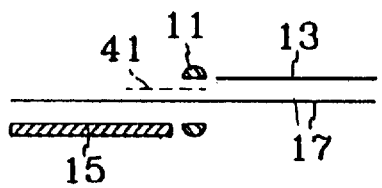
FIG. 3A is a schematic diagram showing a cylindrical nickel-hydrogen cell before the winding process according to a first embodiment of the present invention.
Figure 3B:
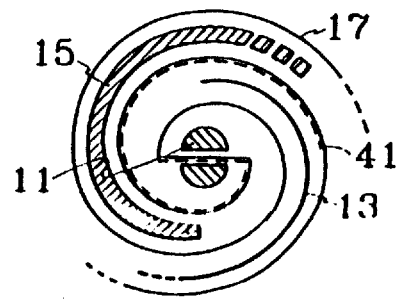
FIG. 3B is a schematic diagram showing a cylindrical nickel-hydrogen cell in the winding process according to a first embodiment of the present invention.
Figure 4:
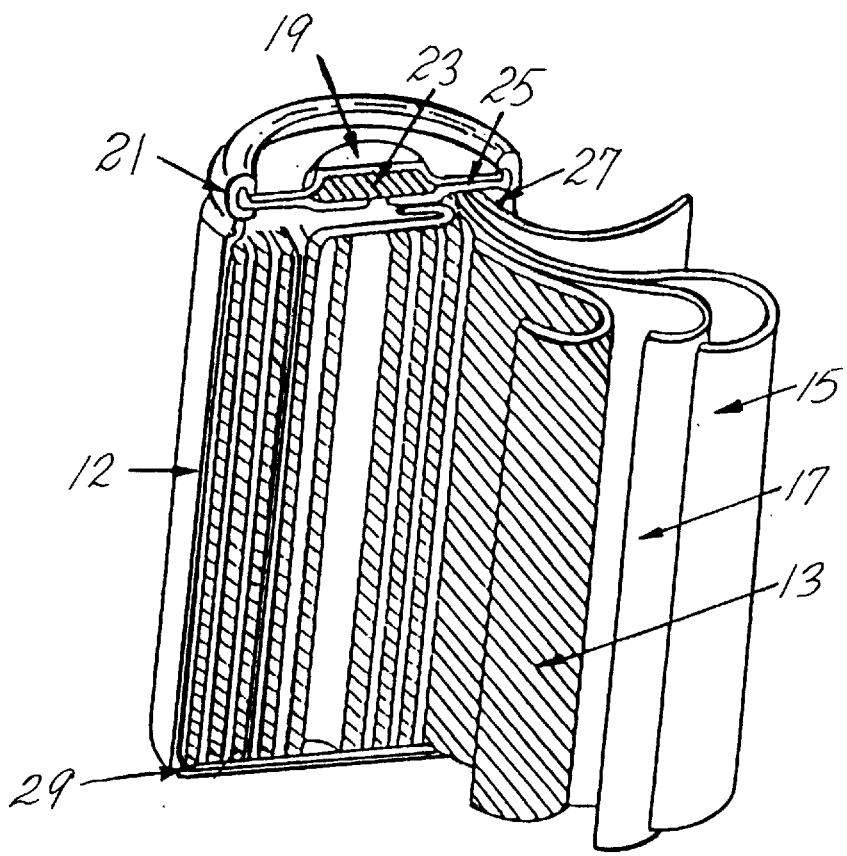
FIG. 4 is an illustration of a structure of a cylindrical cell.

As shown FIG. 3, a cathode (13) having a size of 114×35×0.73 mm and an anode (15) having a size of 149×35×0.40 mm were arranged on opposing sides of a separator (17) having a size of 263×38×0.15 mm. A separator fragment (41) having a size of 26×38×0.15 mm, enough to cover the initial part of the cathode (13) to the mandrel (11), was placed on the cathode side of the separator (17). After winding the cathode (13), the anode (15), the separator (17) and the separator fragment (41) around the mandrel (11), the wound assembly was inserted into a can. Electrolyte injection, assembling and formation were performed to fabricate a cell.

COMPARATIVE EXAMPLE 1

Figure 1B:
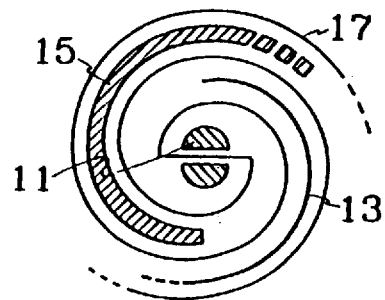
FIG. 1B is a schematic diagram showing a conventional cylindrical nickel-hydrogen cell in the winding process.

As shown in FIG. 1, a cathode (13) having a size of 114×35×0.73 mm and an anode (15) having a size of 149×35×0.40 mm were arranged on opposing sides of separator (17) having a size of 263×38×0.15 mm. After winding the cathode (13), the anode (15) and the separator (17) around the mandrel (11), the wound assembly was inserted into a can. Electrolyte injection, assembling and formation were performed to fabricate a cell.

COMPARATIVE EXAMPLE 2

Figure 2A:
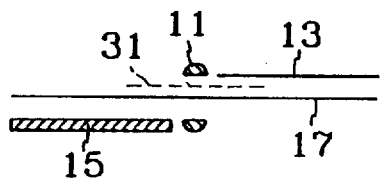
FIG. 2A is a another schematic diagram showing a conventional cylindrical nickel-hydrogen cell before the winding process.
Figure 2B:
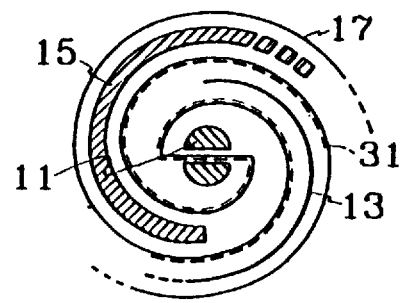
FIG. 2B is a another schematic diagram showing a conventional cylindrical nickel-hydrogen cell in the winding process.

As shown in FIG. 2, a cathode (13) having a size of 114×35×0.73 mm and an anode (15) having a size of 149×35×0.73 mm were arranged on opposing sides of a separator (17) having a size of 263×38×0.15 mm. An additional separator (31) having a size of 149×35×0.15 mm, enough to cover the initial parts of the cathode (13) and the anode (15), was placed on the cathode side of the separator (17). After winding the cathode (13), the anode (15), the separator (17) and the additional separator (31) around the mandrel (11), the wound assembly was inserted into a can. Electrolyte injection, assembling and formation were performed to fabricate a cell.

The following table shows the results of measuring the volume of a cell, injection volume of an electrolyte, internal pressure, and durability according to the above examples and comparative examples.

TABLE

|  | Volume (mm$^3$) | Injection volume of an electrolyte (g) | Internal pressure (kg/cm$^2$) | Durability (cycle) |
| --- | --- | --- | --- | --- |
| Example 1 | 1647 | 3.3 | 10 | 250 |
| Comparative Example 1 | 1500 | 3.3 | 10 | 200 |
| Comparative Example 2 | 1727 | 3.1 | 10 | 200 |

As shown in the above table, the volume of the cell with a separator fragment (41) according to example 1 of the present invention is decreased by a maximum of 4.6% in comparison with a cell with an additional separator (31) according to comparative example 2. Therefore, the internal space of a cell is increased by a maximum of 22% on the basis of injection volume of an electrolyte. The larger internal space prevents increases in internal pressure of produced gas.

The winding defective rate of the cell according to the present invention is decreased by more than 30% in comparison with a conventional additional separator (31).

As shown above, the quality of the cell according to the present invention is excellent because of increased internal space, a larger injection volume of electrolyte, a lower internal gas pressure and a much higher durability than that of a conventional cell.

As shown above, a separator according to the present invention prevents a short-circuit from happening, decreases the packing rate and the winding defective rate, and increases the capacity. As a result, the durability and the yield is increased.

The effect of the present invention on a group of winding electrodes is not limited to the cylindrical nickel-hydrogen cell but also can be applied to a cylindrical cell or condenser with the same structure as the cylindrical nickel-hydrogen cell.

In this disclosure, there is shown and described only the preferred embodiment of the invention, but, as aforementioned, it is to be understood that the invention is capable of use in various other combination and environments and is capable of changes or modification within the scope of the inventive concepts as expressed herein.

What is claimed is:

1. A winding electrode assembly, comprising:

a cathode winding electrode;

a positive terminal linked to said cathode winding electrode;

an anode winding electrode;

a negative terminal linked to said anode winding electrode;

a separator between said cathode and said anode winding electrodes;

an electrolyte between said winding electrodes; and a separator fragment starting substantially at a winding axis of said winding electrodes and extending to an initial part of said cathode winding electrode.

2. The winding electrode assembly of claim 1 wherein said winding electrodes comprises a cylindrical cell or a cylindrical condenser.

3. The winding electrode assembly of claim 1 wherein said winding electrodes comprises a cylindrical nickel-hydrogen cell.

4. The winding electrode assembly of claim 1 wherein the cathode winding electrode, the anode winding electrode, the separator, and the separator fragment are wound together.

5. A method of fabricating a winding electrode assembly, comprising the steps of:

manufacturing a cathode winding electrode by coating a slurry of a positive active material on a first metallic support, and drying and rolling said coated first metallic support;

manufacturing an anode winding electrode by coating a slurry of a negative active material on a second metallic support, and drying and rolling said coated second metallic support;

laying a separator between said cathode and anode winding electrodes;

laying a separator fragment starting substantially at a winding axis of said winding electrodes and extending to an initial part of said cathode winding electrode;

winding said cathode winding electrode, said anode winding electrode, said separator and said separator fragment;

inserting the wound cathode winding electrode, anode winding electrode, separator and separator fragment into a can;

injecting an electrolyte into said can; and mounting a cap assembly in a mouth of said can.

6. A winding electrode assembly, comprising:

a cathode winding electrode;

an anode winding electrode;

a separator between said cathode and anode winding electrodes; and a separator fragment starting substantially at a winding axis of said winding electrodes and extending to an initial part of said cathode winding electrode.

7. The winding electrode assembly of claim 6 further comprising a positive terminal linked to said cathode winding electrode, and a negative terminal linked to said anode winding electrode.

8. The winding electrode assembly of claim 6 wherein the cathode winding electrode, the anode winding electrode, the separator, and the separator fragment are wound together.

9. The winding electrode assembly of claim 8 further comprising a can, and said wound cathode winding electrode, anode winding electrode, separator, and separator fragment disposed in said can.

10. The winding electrode assembly of claim 9 further comprising an electrolyte disposed in said can.

* * * * *